US006551518B2

(12) United States Patent
Gargas (10) Patent No.: US 6,551,518 B2
(45) Date of Patent: *Apr. 22, 2003

(54) COMBINED OZONATION AND ELECTROLYTIC CHLORINATION WATER PURIFICATION METHOD

(75) Inventor: Joseph Gargas, 6316 Wisteria La., Apollo Beach, FL (US) 33572

(73) Assignees: Joseph Gargas, Apollo Beach, FL (US); Robert Murphy, Apollo Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/928,814

(22) Filed: Aug. 13, 2001

(65) Prior Publication Data

US 2001/0050258 A1 Dec. 13, 2001

Related U.S. Application Data (63) Continuation-in-part of application No. 09/351,771, filed on Jul. 12, 1999, now Pat. No. 6,277,288.

(51) Int. Cl.[7] .............................................. C02F 1/467
(52) U.S. Cl. .................. 210/748; 205/752; 205/756; 210/752; 210/754; 210/760; 210/764; 210/787
(58) Field of Search ................... 204/176, 247, 204/252, 293; 205/752, 755, 756; 210/748, 746, 754, 756, 760, 752, 764, 787–789, 167, 169, 192, 198.1, 199, 205, 202

(56) References Cited

U.S. PATENT DOCUMENTS

| | | | | |
|---|---|---|---|---|
| 3,616,355 A | * | 10/1971 | Themy et al. | 205/701 |
| 3,907,686 A | * | 9/1975 | Fletcher et al. | 210/234 |
| 4,361,471 A | * | 11/1982 | Kosarek | 204/265 |
| 4,804,478 A | * | 2/1989 | Tamir | 210/143 |
| 5,395,537 A | * | 3/1995 | Ellison | 210/167 |
| 5,451,318 A | * | 9/1995 | Moorehead | 209/710 |
| 5,584,992 A | * | 12/1996 | Sugimoto | 210/169 |
| 5,660,723 A | * | 8/1997 | Sanderson | 210/138 |
| 5,865,995 A | * | 2/1999 | Nelson | 210/205 |
| 6,054,046 A | * | 4/2000 | Nelson | 210/194 |
| 6,149,825 A | * | 11/2000 | Gargas | 209/713 |
| 6,207,064 B1 | * | 3/2001 | Gargas | 210/205 |
| 6,277,288 B1 | * | 8/2001 | Gargas | 205/752 |
| 6,332,980 B1 | * | 12/2001 | Moorehead | 210/104 |

\* cited by examiner

*Primary Examiner*—Peter A. Hruskoci
(74) *Attorney, Agent, or Firm*—Pendorf & Cutliff (57) ABSTRACT

A water purification system for a swimming pool, pond, aquatic mammal tank, spa or fountain, which is simple to operate, low in maintenance, and highly reliable. The system takes advantage of synergistic benefits derived from the combination of ozonation and electrolytic chlorination in the same system. Combining both of the technologies of Ozonation and Electrolysis allows as in-site production of at least one of chlorine dioxide that is used as a disinfectant agent for treating water reservoirs.

5 Claims, 7 Drawing Sheets

COMBINED OZONATION AND ELECTROLYTIC CHLORINATION WATER PURIFICATION METHOD

RELATED U.S. APPLICATION

This application is a continuation-in-part of Ser. No. 09/351,771, filed Jul. 12, 1999, entitled "COMBINED OZONATION AND ELECTROLYTIC CHLORINATION WATER PURIFICATION SYSTEM," allowed Feb. 26, 2001, and issued as U.S. Pat. No. 6,277,288 on Aug. 21, 2001, the disclosure of which is incorporated herein by reference.

BACKGROUND OF THE INVENTION

1. Field of the Invention

The present invention concerns to a system for treating and disinfecting water and/or wastewater. More specifically, the present invention comprises a method and apparatus capable of disinfecting a water reservoir by generating at least one of chlorite, chlorine dioxide, and chlorate and keeping a residual of ozone in the water for a longer period of time.

2. Description of the Related Art

Water in water reservoirs such as swimming pools, aquatic mammal tank, spas, fountains, and hot tubs is constantly recirculated and fresh water is normally added only to maintain the desired volume. Although this water is usually filtered continuously to keep it free of suspended matter, it frequently contains bacteria. Treatment with one or more sanitizers to control the bacteria count is necessary.

Numerous chemical compounds have been reported for use in water reservoirs such as swimming pools, spas, aquatic mammal tank, fountains, and hot tubs. These chemicals include various quaternary ammonium salts, copper salts, and oxidants such as chlorine sources, bromine sources, ozone, or peroxy compounds such as hydrogen peroxide and potassium peroxymonosulfate. The use of combinations of such sanitizers is also known.

At the present time, the main disinfectant used in swimming pools, spas and hot tubs is chlorine in the form of hypochlorite. Chlorine is an effective bactericide, but suffers from two main disadvantages: 1) at improper pH and concentration levels, it may cause eye irritation; and 2) it has to be added at frequent intervals to maintain an effective concentration for killing bacteria along with health issues.

Ozone has also been used as a disinfectant for swimming pools, spas and hot tubs. Ozone has a short half-life and will be use within seconds/minutes.

Certain quaternary ammonium compounds have also been reported as being useful in swimming pools, spas, and hot tubs as bactericides and algaecides. Those used as bactericides and algaecides have required relatively high levels to give the rapid bacteria kill times needed for pool treatment. However, at such high concentration levels, quaternary ammonium salts in general have the potential of producing objectionable, aesthetically unpleasing turbid swimming pool water having a high total organic carbon (TOC) content. Furthermore, such high concentrations of quaternary ammonium salts may increase the likelihood of skin irritation along with chlorine.

Recent developments in the prior art include the use of chlorine dioxide for treating water and/or wastewater. The area of application ranges from the disinfection of drinking water and bathing water to treatment of service water and wastewater. In comparison with the classic oxidizing disinfectants chlorine and hypochlorite, chlorine dioxide is distinguished in use by an outstanding ecobalance. Thus, when chlorine dioxide is used, only small amounts of AOX ("adsorbable organic halogen compounds"; overall parameter for all chlorine, bromine and iodine compounds which can be adsorbed to activated carbon and have very different hazard potentials) and virtually no trihalomethane (TEM, haloforms) are formed.

There are a variety of chlorine dioxide generator systems and processes available in the marketplace. Most of the large-scale generators produce chlorine dioxide by reacting a chlorate ion with hydrogen ions and an electron. This reaction can be represented by:

$$ClO_3^- + 2H^+ + e^- = ClO_2 + H_2O$$

These generators use sodium chlorate and/or chloric acid to provide the chlorate ions. Hydrogen ions are supplied by sulphuric or hydrochloric acid. The electron can be provided by a reducing agent such as methanol, sulphur dioxide or sodium chloride.

Unfortunately, a problem exists in that these generators produce undesirable by-product salts such as sodium sulfate ("salt cake"), sodium bisulfate, and/or sodium chloride. As the concentration of these by-products salts rises, it begins to precipitate out of solution and must be removed.

The prior art shows another process of producing chlorine dioxide from a solution of chloric acid. Chloric acid is made by passing alkali metal chlorate through a cation exchange resin. The resulting chloric acid is reduced using hydrochloric acid in the presence of a catalyst. Sodium bisulfate and sodium sulfate are produced as by-products requiring disposal in this reaction.

The prior art shows processes that produce a chlorine dioxide of very high purity at good yields, based on the chlorite used, but it is highly restricted in its applicability and is little suited to industrial application "on site", not only because of the high cost of equipment for separating the chlorine dioxide, but also because of the high explosion hazard of the gaseous chlorine dioxide.

There is thus a need for a new water reservoir disinfecting system that would reduce maintenance labor and chemical costs for maintaining ponds, fountains, hot tubs and swimming pools. Also, there is a need for a disinfectant that can be produced on site to prevent the re-growth of bacterial populations in the disinfected water.

It is believed that the present invention represents a viable alternative to the above-noted problems with existing water reservoir bactericides.

SUMMARY OF THE INVENTION

It is an object of the present invention to significantly eliminate the problems and drawbacks of the prior art, while providing comparable water disinfecting results.

It is yet another object of the present invention to provide a disinfectant agent for a water reservoir system that is capable of disinfecting utilizing either no, or a small portion of, chemicals that are utilized by existing chemical disinfecting systems.

It is yet another object of the present invention to provide such a water disinfecting system that can be used to purify water for drinking, recreational, and/or industrial use.

It is yet another object of the present invention to produce chlorine dioxide on site.

It is yet another object of the present invention to provide a water purification system that can be easily adopted into the filter lines of existing re-circulating water systems.

It is yet another object of the present invention to provide a water purification system comprising improved mechanical filtration along with improved disinfection, so as to allow the pool owner a simpler way of maintaining their pond, pool, hot tub, or fountain and cut maintenance time by 90% or more as well as chemical costs.

These and other objects of the present invention have been accomplished by a water purification system comprising, broadly, in sequence, an ozone injector for injecting ozone into a water stream; an electrolytic chlorinator for introducing at least one of chlorite, chlorine dioxide and chlorate into said stream of water; and an ozone contact chamber (OEC system).

Alternatively, the system comprises in sequence an ozone injector for injecting ozone into a water stream; an ozone contact chamber; and an electrolytic chlorinator for introducing at least one of chlorite, chlorine dioxide and chlorate into said stream of water (OCE system).

Broadly, the ozone contact chamber includes a top end, a bottom end, an output line, and an input line.

Advantageous embodiments of both system according to the present invention include the following:

A first embodiment comprising in sequence, optionally a vortex separator for initial separation of larger solids and particulate matter; optionally a mechanical filter which may be a conventional pool filter using sand, diatomaceous earth, or paper cartridge as filtering medium; followed by OEC system or the OCE system.

A second embodiment in which the contact chamber includes a drain valve at the lower portion of the contact/dissolution chamber for cleaning the chamber.

A third embodiment in which the contact chamber includes a drain valve at the lower portion of the contact/dissolution chamber for cleaning the chamber and a second valve on the output line of the contact chamber to increase the pressure in the contact chamber and allow greater dissolution of the ozone in water.

A fourth embodiment in which the contact chamber includes a by-pass line entering the contact chamber.

A fifth embodiment in which the contact chamber includes a by-pass line for entering the contact chamber and a valve on the output line of the contact chamber to increase the pressure in the contact chamber and allow greater dissolution of the ozone in water.

A sixth embodiment comprising a second electrolysis generator and control box installed in series when the pool is in excess of 25,000 gallons.

The present invention further presents a method of producing at least one of chlorite, chlorine dioxide and chlorate on site by combining ozonation and electrolytic chlorination.

The present invention contemplates a method of treating a water reservoir by using at least one of chlorite, chlorine dioxide, and chlorate, the method comprising the steps of:

(a) producing at least one of chlorite, chlorine dioxide, and chlorate by:
  feeding ozone into a water stream containing chloride to produce ozonated-chloride water; and
  electrolyzing said ozonated-chloride water inside an electrolytic cell to produce at least one of chlorite, chlorine dioxide and chlorate;
(b) introducing at least one of chlorite, chlorine dioxide and chlorate into a water reservoir.

The present invention further contemplates a method for treating a swimming pool or spa, comprising:

(c) generating a flow of water in a water reservoir system; and
(d) introducing a bacteristatic effective amount of at least one of chlorite, chlorine dioxide and chlorate into said flow of water;
  wherein said at least one chlorite, chlorine dioxide and chlorate is produced by subjecting said flow of water containing chloride ion to ozonation followed by subjecting said ozonated water to electrolytic chlorination.

Finally, the present invention contemplates a method for treating a swimming pool or spa, comprising:

(a) generating a flow of water in a water reservoir system; and
(b) introducing a bacteristatic effective amount of at least one of chlorite, chlorine dioxide and chlorate into said flow of water;
  wherein said at least one of chlorite, chloride dioxide and chlorate is produced by subjecting said flow of water to electrolytic chlorination followed by subjecting said chlorinated water to ozonation.

The foregoing has outlined rather broadly the features and technical advantages of the present invention in order that the detailed description of the invention that follows may be better understood. Additional features and advantages of the invention will be described hereinafter, which form the subject of the claims of the invention.

BRIEF DESCRIPTION OF THE DRAWINGS

For a fuller understanding of the nature and objects of the present invention, reference should be made by the following detailed description taken in with the accompanying drawings in which:

FIG. 3a is a perspective view of the vortex separator for initial separation of solids from water;

FIG. 3b is a top view of the vortex separator of FIG. 3a; and

FIG. 3c is a perspective view of the tubular vortex separator of

FIG. 3a connected to a collection chamber.

DETAILED DESCRIPTION OF THE INVENTION

This invention relates to an improved method and device for the disinfecting of water reservoirs. The invention takes advantage of synergistic benefits derived from the combination of ozonation and electrolytic chlorination in the same system. Ozone acts not only as an oxidizer of organic matter and metals, it also serves as a microfloculant, and thus, as a clarifier. The combination of ozonation and electrolytic chlorination produces at least one of chlorite, chlorine dioxide, and chlorate that react synergistically to kill bacteria, spores, viruses, algae, and other microorganisms, and to oxidize sulfides, cyanides, and other organic and inorganic substances. The invention is also useful in treating water reservoirs having a high particulate or organic content.

Chlorine dioxide is a stronger oxidant than chlorine and a better disinfectant agent and it is not temperature and pH dependent.

Now a process has been discovered which permits the production of produces at least one of chlorite, chlorine dioxide, and chlorate on site without production of undesirable by-product salts. In addition, a reduction of process steps and process equipment required for the production of chlorine dioxide is achieved using the claimed invention.

The water purification system according to the present invention comprises, broadly, in sequence, an ozone injector for injecting ozone into a water stream; an electrolytic chlorinator for introducing chlorine into said stream of water; and an ozone contact chamber (OEC system).

Alternatively, the system comprises in sequence an ozone injector for injecting ozone into a water stream; an ozone contact chamber; and an electrolytic chlorinator for introducing chlorine into said stream of water (OCE system).

The ozone contact chamber generally includes a top end, a bottom end, an output line, and an input line.

A first embodiment comprising in sequence, optionally a vortex separator for initial separation of larger solids and particulate matter; optionally a mechanical filter which may be a conventional pool filter using sand, diatomaceous earth, or paper cartridge as filtering medium; followed by OEC system or the OCE system.

These components will first be described individually, is after which the assembly and operation of the system as a whole will be described.

Vortex Separator (Optionally)

The vortex separator is provided prior to the mechanical filter (adsorption filter) in order to separate out particulates of higher density from the water before the water reaches the mechanical filter, thereby cutting down on the loading of the filter and thus not only reducing the size requirement of the filter, but also extending the interval between filter changes and the life of the filter because abrasive particles such as sand can be removed in advance of contacting the filter.

It is the centrifugal force created by the acceleration of the vortex that causes particles to move toward the outside of the vortex thus leaving a clean center. One such filter, referred to as a cyclone separator, is described in U.S. Pat. 3,802,570 (Dehne). This filter however has a complex design, comprising pipes of many different diameters and shapes, and comprising both square and round tubular and conical sections. There is a need for a filter having a simpler design, yet adequate effectiveness.

Another suitable vortex particle separator of conventional design is described in U.S. Pat. No. 3,907,686 (Fletcher et al.). The separator removes particulate matter of greater density than the water by centrifugal action. The centrifugal action is induced by swirling the fluid and particulate in a vorticular manner. The fluid input to the separator is provided at its upper end by an inlet, which opens tangentially into a cylindrical-shaped upper chamber. Below the chamber is a conical chamber, which terminates at a lower opening. The lower opening is the entrance to a trap or pot where particulate, which has been separated from the fluid, is accumulated and prevented from re-entering the normal flow of fluid. As fluid enters the upper chamber, a vorticular motion is induced in the fluid, creating centrifugal forces, which cause those particles, which are heavier than water to move toward the outside wall of the upper chamber. The lighter fluid remains in the center of the chamber and can be withdrawn. The particulate matter slides down along the walls and eventually goes through the entrance and into the trap, which contains dead (still) water. Since the trap is not in the water circulation path, it keeps biodegradable substances out of the water being treated, thus reducing the disinfection demand.

Further examples of vortex separators are described in U.S. Pat. No. 4,306,521 (Giles), U.S. Pat. No. 4,412,919 (Ueda), U.S. Pat. No. 5,599,365 (Alday et al.), and U.S. Pat. No. 5,879,545 (Antoun), the teachings of which are incorporated herein by reference.

While a vortex separator as described by Fletcher et al. or the other patents listed above can be used in the present invention, the present invention preferably employs a vortex separator which is simpler in design and assembled from easily obtained, conventional plumbing components, thereby reducing the cost of constructing and maintaining the system of the present invention.

In the present invention, the vortex separator is preferably a generally tubular element comprising an elongated sideways T-junction. The T-junction comprises first and second coaxial longitudinal arms that, in use, will be oriented vertically, and one perpendicular feed arm that, in use, will be oriented horizontally. In the simplest embodiment, the three arms of the T-junction have approximately the same diameter, with at least the first or lower longitudinal arm, measured from the center of said "T" junction to the end of the arm, having a length of at least three times, more preferably from four to six times, its diameter.

Such a vortex separator can be easily constructed from piping materials, preferably PVC piping, as conventionally used in swimming pool construction. Beginning with a conventional 2 inch T-junction, pipes are inserted into the opposite sides of the coaxial arms of the T-junction. This elongated section becomes the longitudinal section of the junction, which is oriented vertically in operation.

At least one half of the inlet between the horizontal or perpendicular arm and the vertical channel formed by the two longitudinal arms is blocked so as to provide a tangential inlet. That is, water from the feed arm enters the vertical channel along the annular wall, smoothly follows the wall, and is thus immediately brought into a vorticular motion.

This blocking is most easily accomplished by taking a section of pipe having an outer diameter which is the same as, or slightly larger than, the internal diameter of the T-junction, cutting about a three inch long section in the case of a two inch internal diameter T-junction, and cutting this section in half lengthwise so as to make two equal sections, each being arcs describing 180 degrees. One of these sections is then introduced into the longitudinal section of the T-junction in a manner so as to block at least 50%, more preferably about 75%, most preferably about 85–90% of the opening between the perpendicular arm and the longitudinal channel of the T-junction. As a result, fluid flowing from the perpendicular arm into the longitudinal channel of the T-junction enters tangentially, thereby imparting a swirling vortex flow pattern to the water inside the longitudinal channel of the T-junction.

Since the longitudinal channel of the T-junction is oriented vertically, particulate matter tends to be forced to the outside wall of the longitudinal channel and drops down the first or lower longitudinal arm of the T-junction, to be collected in a trap or pot connected to the bottom of the lower longitudinal arm, where it is collected and later removed. Water, which tends to be free of particulate flows upwards and moves to the next section of the water treatment system.

In the Northern Hemisphere, it is preferred that the vortex generator is so designed that (looking down) the water enters on the left side of the T-junction, thereby giving it a clockwise spin. South of the Equator, it is preferred that the water enters to the right, which will give the vortex a counterclockwise spin. This results in the vortex being aided by, rather than fighting against, the Coriolis force.

The vortex separator is used in conjunction with a mechanical filter.

Mechanical Filter (Optionally)

While the vortex separator described above can remove a large proportion of the particulate matter from water, it has been found that the effectiveness of the ozonation and chlorination treatments can be optimized if the water is subjected to a further filtration prior to chemical treatment. This filtration may be by any of the filters conventionally employed in filtering of pools, such as a sand, diatomaceous earth, paper, or even carbon filter, but in practice is preferably a cartridge type paper filter.

For example, U.S. Pat. No. 4,263,139 (Erlich) teaches a filter element for fluid circulating system primarily adapted for removing algae and other fine contaminants from swimming pool water comprising pleated filtration medium arranged in a cylindrical configuration having an open central area, a cap bonded to one end of the filtration medium to close the open central area, an adapter bonded to the opposite end of the filtration medium for connection to a flow source to direct the flow of water into the open central area for passage through the filtration medium in a direction from inside to outside and an outer support member disposed on the exterior of the filtration medium and closed at one end and secured at the other end to the adaptor to restrain the filtration medium. The outer support comprises a multiplicity of braided criss-cross strands of metallic or nonmetallic material defining a tubular structure, which is adapted to permit limited radial expansion of the filtration medium to expose the full area thereof to the flow.

The present invention is not limited to such a filter, and any of those conventionally employed in the industry can be employed herein.

Ozone Injector

It is known to introduce ozone into water to eliminate contaminants, in particular, bacterial contaminants. Ozone is produced by a high efficiency generator and is initially mixed with water using a venturi mixer or inductor port to inject ozone into a fluid stream of water by venturi suction or high-pressure injection.

Ozone can be produced by passing oxygen through the space between two electrodes, which conduct high voltage current in ozone generator. A dielectric insulating material causes a breakdown of the current in the space between an inner electrode and an outer electrode. This breakdown of the current between the electrodes produces a corona electron field of high energy. As oxygen passes through this corona field, oxygen molecules attract addition electrons, causing the oxygen molecules to disassociate and form separate oxygen atoms. Some of these free oxygen atoms will recombine to form ozone; three oxygen atoms with three electrons. Ozone is effective as a filter aid to partially oxidize organic matter and metals suspended in the liquid being treated and to prevent the formation of scale that could clog the filter media. Dissolved ozone also forms an oxide coating on the surface of submerged metals, preventing corrosion. An ozone molecule is a rapid oxidizer that will reduce organic molecules quickly. Partially oxidized organic matter and metals gain electrons and assume a positive attraction for other negatively charged matter or metals, causing them to amalgamate, forming larger clumps easily removed by a filter. However, an excess amount of ozone in the liquid stream can cause organic matter or metals to completely dissolve, and thereby pass though a filter element, which is undesirable. By monitoring the differential pressure across a filter element and adjusting the ozone output of an ozone generator, the filtering efficiency of the system can be optimized, manually or automatically under computer control.

Conventional electrodes used in corona-discharge ozone generators use a solid conductive material to form and inner electrode spaced from an outer electrode. To avoid excessive resistance heating, the electrode sizes must be increased for high current applications. Improved performance can be obtained by using a perforated or grill-like outer electrode, with a fan or the like to blow cooling air over the electrodes. The inner electrode is preferably a quartz-glass vacuum tube containing a gas vapor, which acts as the conductor-electrode, with the quartz glass wall of the vacuum tube acting as the dielectric insulator. The conductive vapor molecules inside the vacuum tube form a "bridge" which conducts high voltage current over the entire interior surface of the inner electrode, providing a much large surface area than the surface area which is normally available on a continuous solid conductor tube or flat-plate surface used as an inner electrode in conventional corona-discharge generators.

A motorized veriac transformer may be used to adjust the current to the high-voltage transformer supplying the ozone generator so that the amount of ozone produced may be increased or decreased. The veriac transformer may be manually adjusted or automatically controlled by controller.

Ozone may also be generated through ultraviolet irradiation of air within a housing. It is well known that ultraviolet radiation in air will alter the molecular structure of oxygen ($O_2$), to produce ozone ($O_3$). Ultraviolet light located in an air environment or air space within a tube will convert some of the oxygen molecules in the air space between the light and the tube to ozone molecules. Each time the system is shut down, the effectiveness of the system becomes reduced.

Corona discharge type ozone generators are preferred in the present invention in view of efficiency and reliability. U.S. Pat. No. 5,855,856 (Karlson) teaches an ozone generating apparatus that includes an ozone generator having concentric electrodes and a means for generating a corona discharge between the electrodes, a pump for re-circulating a portion of the ozone-containing gas leaving the generator through a conduit which is configured to receive a portion of the ozone containing gas, and a heat exchanger for cooling the recirculated portion of the ozone containing gas. An oxygen-containing gas is also introduced to the heat exchanger and combined with the recirculated gas portion to form a feed gas, which is chilled in the heat exchanger and then introduced into the generator. See also U.S. Pat. No. 5,766,560 (Cole).

Other types of ozone generators for use in treatment of water are well known, such as a high frequency corona discharge ozonator, and detailed descriptions can be found, for example, in U.S. Pat. No. 5,451,318 (Morehead), U.S. Pat. No. 5,709,799 (Engelhard), U.S. Pat. No. 5,326,539 (Taylor), U.S. Pat. No. 4,141,830 (Last), U.S. Pat. No. 5,266,215 (Engelhard), U.S. Pat. No. 5,540,848 (Engelhard), and U.S. Pat. No. 5,518,698 (Karlson et al.), the disclosures of which are incorporated herein by reference.

The water containing ozone (and usually oxygen, which may be in the form of substantially pure oxygen, air, or other suitable mixture of gases that includes oxygen) is then conveyed to a contact chamber.

Ozone Contact/Dissolution Chamber

In conventional ozone contact chambers, the ozone gas is applied at the base of a tall column. The ozone-oxygen bubbles float to the surface slowly, their upward movement slowed by the downward counter flow of the water stream to achieve a longer contact time in order for the ozone to be dissolved in the water column before the water passes from the mixing column. Such a column must be extremely tall and is difficult to install in ordinary sized plant equipment rooms. The concentration of dissolved ozone-oxygen is undesirably diluted in the larger vertical columns. While ozone-oxygen contact in mixing chambers is generally effective, there is a need for improved mixing in smaller mixing vessels.

Attempts to improve the contact particularly in conjunction with swimming pools are described in U.S. Pat. No. 4,640,783 ((Kern) and U.S. Pat. No. 4,966,717 (Kern). However, these systems require much space or must be deployed inside the swimming pool itself. Further improvements are required.

The present invention uses a contact chamber wherein ozone-containing water is injected generally horizontally and tangentially at or near the upper end of the chamber. Depending upon the amount of gas accumulated in the upper end of the chamber, the injected ozone-containing water may fall slightly through a reservoir of ozone, which collects near the top of the chamber before tangentially hitting turbulent swirling water, which fills most of the chamber. The tangential impact of the injected water, together with the large number of bubbles present in the water, results in a turbulent swirling motion of the water. An outlet pipe extends into the chamber and has an inlet opening near the bottom of the chamber. Due to the splashing and the swirling movement, the ozone achieves an excellent contact with the water.

In another preferred embodiment, the water enters the contact/dissolution chamber straight. Further, due to the location of the ozone-laden water inlet at the top of the chamber, and the location of the contact chamber outlet at or near the bottom of the chamber (which is contrary to the conventional design), ozone bubbles tend to form a laminar stratification in the contact chamber. That is, the larger bubbles tend to gravitate towards the top of the tank, where they are acted upon and broken down by the impact of the injected ozone-laden water. The finer the bubbles, the lower the buoyancy of the bubbles, and the greater the likelihood that the bubbles will be entrained in the downward-and-outward flowing water and migrate toward the bottom of the tank and ultimately leave the tank in the form of super-fine bubbles or completely dissolved ozone. Thus, a laminar m stratification is formed, with larger bubbles having greater buoyancy and collecting near the top of the contact chamber, with decreasing diameter bubbles with increasing depth in the contact chamber, and finally with super fine bubbles, or dissolved ozone, at or near the bottom of the tank.

Obviously, utilization of the ozone is optimized, since large bubbles tend to remain in the contact chamber until broken down, and only fine bubbles or completely dissolved ozone tend to leave the contact chamber. As a consequence, as the water containing organic matter and metals enters the contact chamber and flows downwards through the laminar stratifications and into layers with ever-finer bubbles, and finally leaves the contact chamber, organic matter and metals tend to be exposed to super fine or dissolved ozone and to be completely oxidized. It is surprising that this superior effect is achieved in a system, which is contrary to the conventional tall column contact chamber wherein ozone bubbles are introduced into the bottom of the tank and percolate upwards. It is also surprising that superior contact time can be achieved in a contact chamber, which is not long and slender as dictated by conventional wisdom, but rather is short and wide.

The present invention thus provides advantages which would be expected to be associated with a tall column contact chamber, but without the space requirement, and provides the advantages which would be expected to be found in a long spiral tube contact chamber, but without the disadvantageous pressure drop between water inlet and exit.

In a first preferred embodiment of the present invention, the system comprises in sequence, a vortex separator for initial separation of larger solids and particulate matter; optionally an absorption or adsorption filter which may be a conventional pool filter using sand, diatomaceous earth, or paper cartridge as filtering medium; an ozone injector; an electrolysis plate for production of chlorine dioxide, and an ozone contact chamber.

Figure 4:
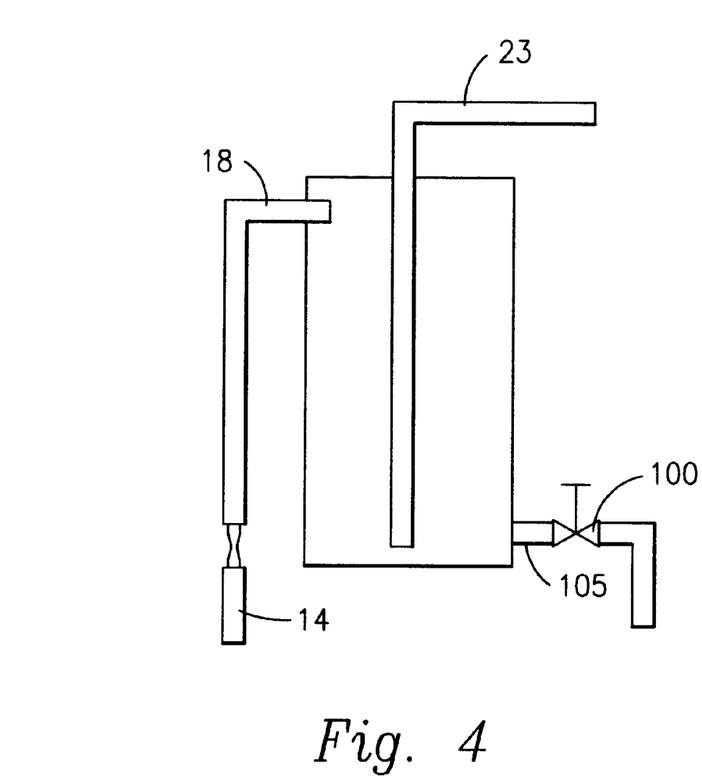
FIG. 4 shows the ozone contact chamber according to the second preferred embodiment of the present invention.

In the second preferred embodiment of the present invention, the contact chamber includes a drain pipe 105 for maintaining and cleaning the contact chamber that is controlled by a manual drain valve 100. The drain pipe 105 is located at the lower portion of the contact /dissolution chamber.

Figure 5:
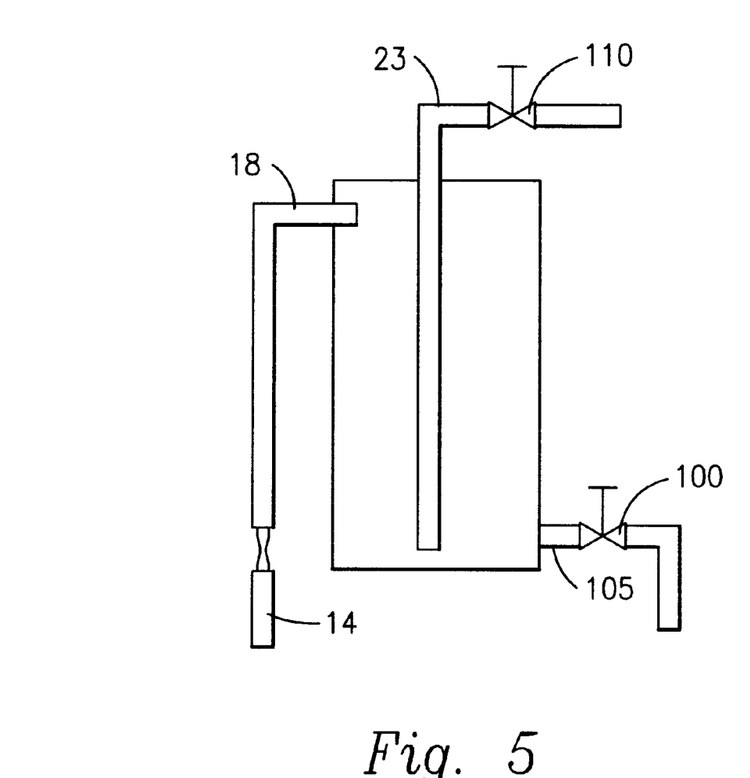
FIG. 5 shows the ozone contact chamber according to the third preferred embodiment of the present invention.

In the third preferred embodiment of the present invention, the contact chamber includes a drain valve 100 at the lower portion of the contact/dissolution chamber for cleaning out the contact chamber, and a second valve 110 on the out flow line 23 of the contact chamber. The second valve increases the pressure within the contact chamber making the ozone dissolution in the water more efficient because more gas can be dissolved. Any type of valve that restricts water flow can be used, such as a ball valve.

Figure 6:
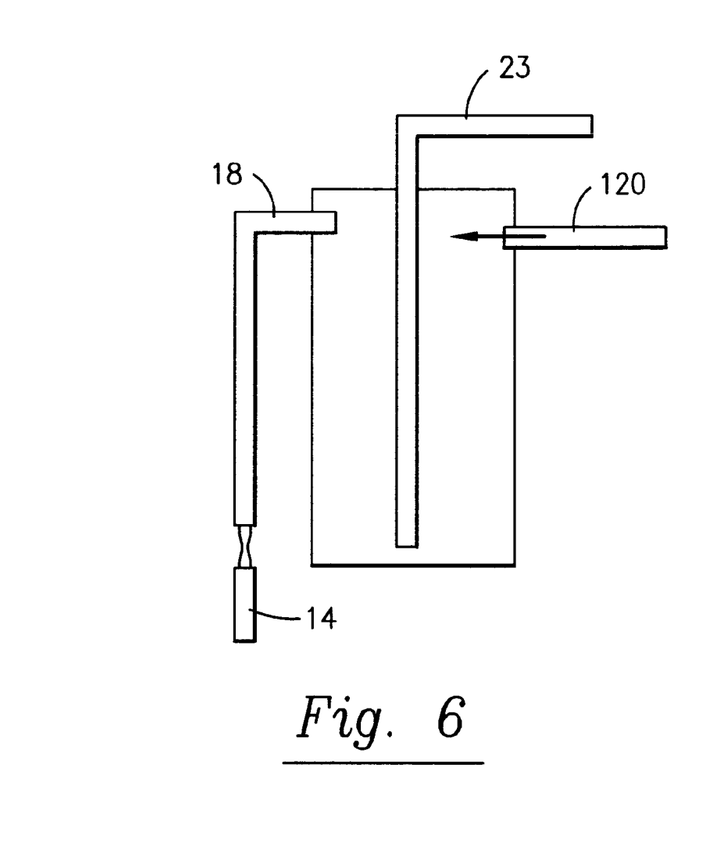
FIG. 6 shows the ozone contact chamber according to the fourth preferred embodiment of the present invention.

In the fourth preferred embodiment of the present invention, the contact chamber includes a second line (by-pass line) 120 for by-passing the vortex separator. The by-pass line 120, has a diameter between 1 to 6 inches, is added to the contact chamber when the need for water is higher than what the vortex separator can deliverer. The vortex separator can only deliver certain amount of water depending upon its size. The larger the vortex separator, the higher will be the cost.

Thus, only a portion of the water will be treated with ozone and be blended with untreated water in the contact/dissolution chamber.

Figure 7:
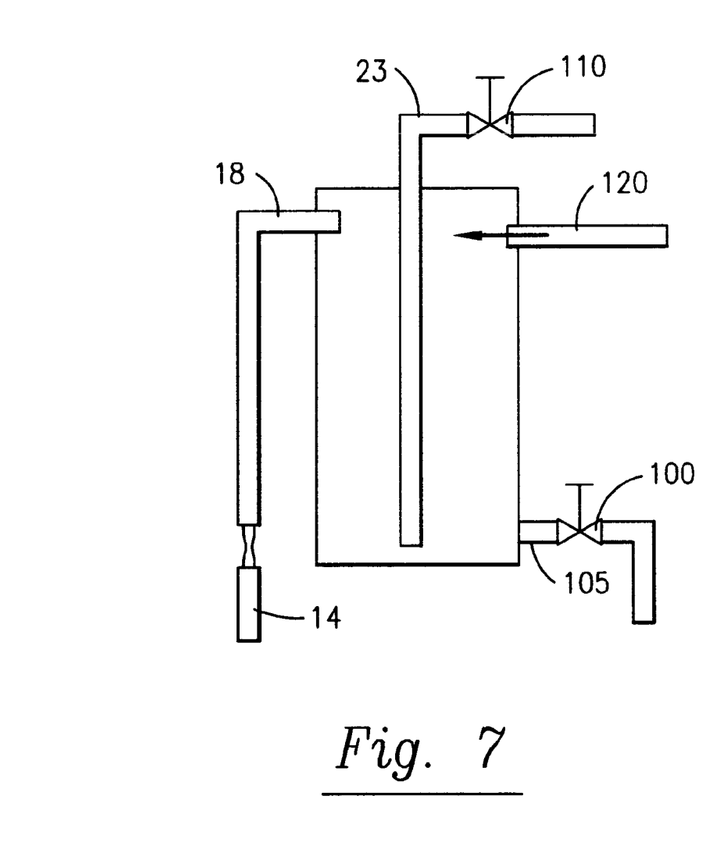
FIG. 7 shows the ozone contact chamber according to the fifth preferred embodiment of the present invention.
Figure 8:
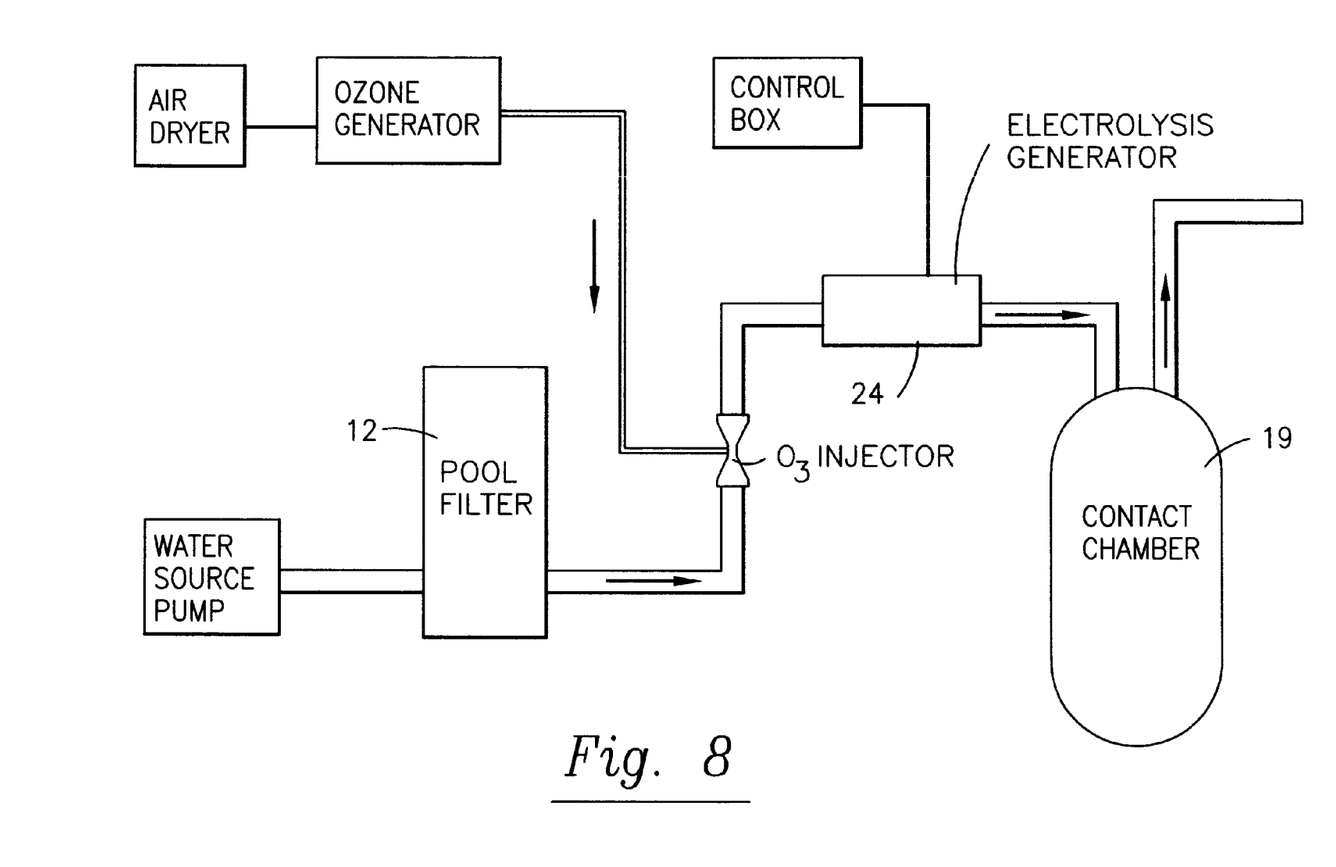
FIG. 8 schematically represents the water purification system shows the ozone contact chamber according to the alternate first preferred embodiment of the present invention.
Figure 9:
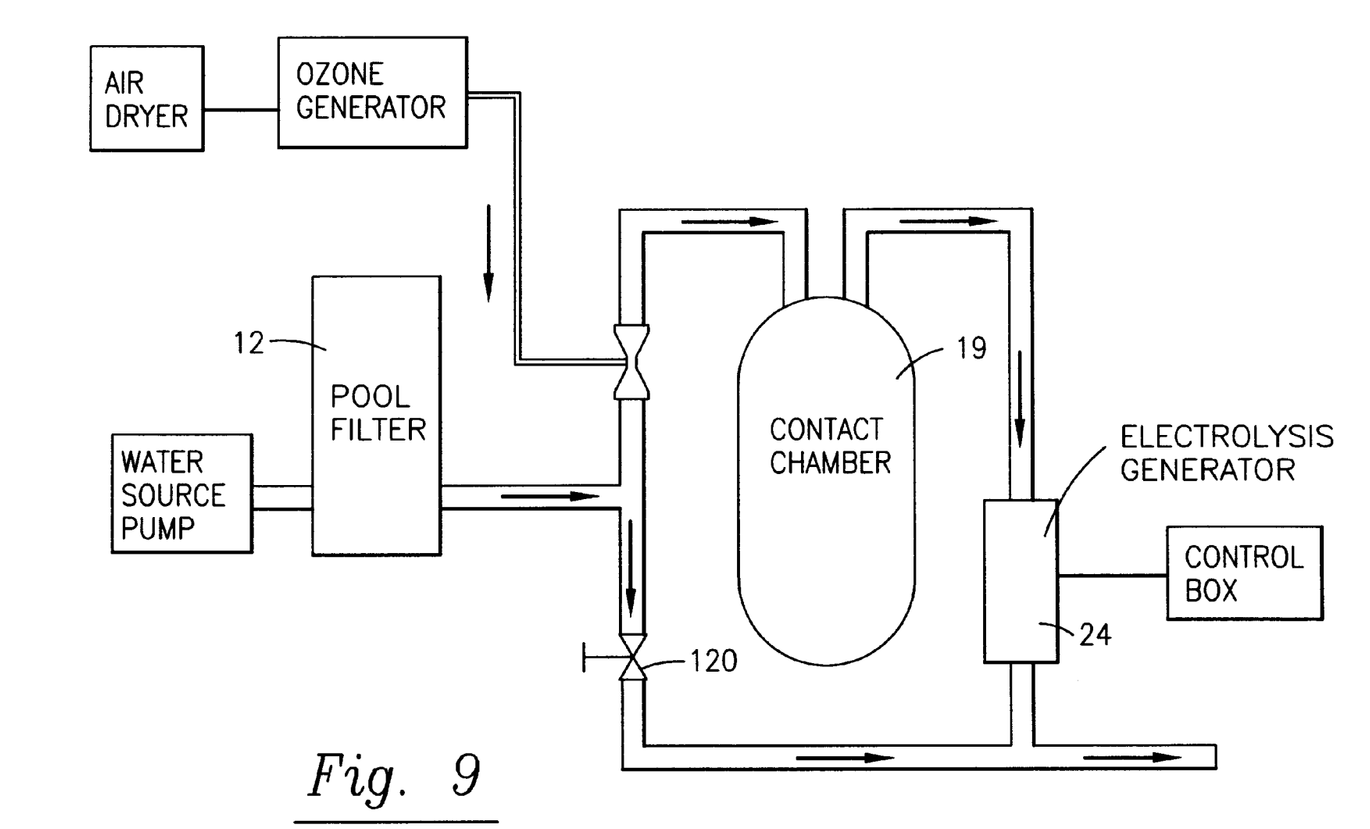
FIG. 9 schematically represents the water purification system including a by-pass valve.

In the fifth preferred embodiment of the present invention, the contact chamber includes a side stream by-pass line 120 for by passing the vortex separator and a valve 110 on the output line of the contact chamber to increase the pressure inside the chamber.

Electrolytic Chlorination

The nascent electrolytic production of chlorine gas from an electrically conducting solution, which contains chloride, is facilitated by applying a current across a submerged positively charged anode. The electrolyte will also contain a negatively charged cathode to complete the circuit. The chloride anions present within the electrolyte are oxidized to produce chlorine gas. An energy source of direct current or of a rectified alternating current is used to provide the necessary electrical potential.

Parallel with the production of chlorine gas at the anode, cationic hydronium ions present from dissociated water are reduced at the negatively charged cathode and result in the generation of hydrogen gas. As the water is dissociated into the components of hydronium cations and hydroxide anions, and with the further transformation of hydronium ions into hydrogen gas, there is the ensuing production of an aqueous caustic or hydroxide solution at the cathode.

The apparatus used to electrolytically generate chlorine gas, hydrogen gas, and the residual hydroxide solution is termed a "Chlor-alkali cell" (see, Chemical Engineering, 85(16):106 (1978). The three types of chlor-alkali cells are: the mercury amalgam cell, the asbestos diaphragm cell, and the membrane cell. The inherent design of chlor-alkali cell is established on the basis of optimizing the generation of chlorine gas, generating a relatively pure solution of hydroxide (caustic) exclusive of chlorides, minimizing the conversion of chlorine gas to chlorine oxides, and maintaining a separation of chlorine and hydrogen gasses to minimize the loss of chlorine gas via chemical reaction to hydrochloric gas. The separation of the anode compartment-anolyte, and the cathode compartment-catholyte can optimize these operating conditions. This separation has been achieved by chemical and physical means using, respectively, physiochemical solubility or a physical barrier.

In the operational application of the membrane cell, various constituents such as precipitated compounds, electrode debris, and suspended solids in the make-up water, tend to plug the membranes and render them inoperable or significantly decrease conductive capacities, resulting in an excessively inefficient electrolytic cell. An additional problem associated with the use of a membrane in the chlor-alkali cell is physical stress due to high temperatures, the presence of chlorine (an oxidizing environment), and swelling of the membrane from water hydration. These difficulties result in the stretching, shrinking, and warping of the membrane such that the membrane under these conditions causes electromotive shorts and result in an inefficient cell.

In order for a chlor-alkali cell to generate chlorine gas, a source of chlorides must be present in the analyte which, when oxidized, forms chlorine gas. The most common sources of chlorides used in the electrolyte are sodium chloride (table salt), which is granulated or in the form of rock salt, hydrochloric acid, or potassium chloride. In any event, a source of anionic chloride must be provided for the generation of chlorine gas, and the source of chlorides can actually be provided from any one of numerous chloride salts.

Within the general sector of the application of chloralkali cells focusing on the generation of chlorine gas, there exists a division of on-site application, which utilizes the generated chlorine gas as a disinfectant when mixed with water. The active biocide is hypochlorous acid. These on-site chlorine generating units retain certain additional design modifications, which facilitate operation and convenience.

One of these divisions in the use of the chlor-alkali cell is the use of the chlorine generator within swimming pool applications. Several varieties of swimming pool chlorine generators exist and include: the direct addition of salt to the pool water and the passing of this saline pool water over an anode and cathode within a non-partitioned electrolytic unit; the generation of chlorine with a non-partitioned cell using a hydrochloric acid electrolyte and the subsequent addition of the electrolyte directly to the swimming pool for chlorination and pH control purposes; the generation of a chlorine gas and hypochlorous acid anolyte solution from a sodium chloride electrolyte using a membrane cell with the direct application of the anolyte to the pool for disinfection purposes and the altered addition of the caustic solution to either the pool or to drain for pH control of the pool; and the generation of chlorine gas using a conventional type membrane cell with the chlorine gas administered using an aspirator mixing unit to combine the chlorine gas with the pool water plus retaining a means to continuously withdraw abrasive caustic from the unit.

U.S. Pat. No. 4,361,471 (Kosarek) teaches an open-cell electrolyte chlorine generator such as a type used for the chlorination of various aqueous streams including swimming pools. The generator is constructed without the use of a diaphragm or membrane isolating or partitioning the electrolyte between the anode and cathode. Instead, a gas separating plate separates the electrolyte above horizontally projecting electrodes, in order to keep the different gasses generated at the different electrodes separated as they rise to the top of the cell. Aqueous buffering reagents are added to the chloride containing electrolyte to neutralize the hydroxide anions generated at the cathode and to optimize the evolution of chlorine gas by stabilizing the pH of the electrolyte. The chlorine and hydrogen gasses produced may be separately added to the solution, which is to be treated, with an optional cooling circuit taking the pre-treated solution and passing it through the cell (in heat exchanging tubing) prior to treatment with the gasses. Thus, during much of the operation of the cell, only the desired product (chlorine gas) and the easily disposed of hydrogen gas must be removed from the cell.

U.S. Pat. No. 4,613,415 (Wreath, et al.) teaches an electrolytic cell for generating chlorine gas and caustic and delivering only these products of the electrolytic cell to a swimming pool. The electrolytic cell is vented above the catholyte, and a catholyte overflow conduit has its inlet at an upper part of the cathode chamber, the overflow conduit being connected to a venturi. The catholyte overflow conduit has an inlet for chlorine connected to it, which inlet is above the anolyte in the anode chamber; preferably, the chlorine inlet and the catholyte overflow conduit are joined into a single chlorine gas and catholyte outflow conduit, which is connected to the venturi. The catholyte volume is between 41/4 and 43/4 gallons. A hydrometer is provided in the cathode chamber to signal an excess strength of catholyte. The anode is of pressed carbon, having a titanium connector plug. A cation membrane is secured between an annular flange and a ring. A method of operating an electrolytic cell for delivering chlorine and sodium hydroxide to a swimming pool is taught, which includes the establishment of an alkalinity in the body of water in the swimming pool of approximately 80–150 ppm. U.S. Pat. No. 5,362,368 (Lynn, et al.) teaches an electrolytic chlorine gas generating system. The system includes an electrolytic cell generating the chlorine gas, a brine tank supplying saturated brine to the anode compartment of the cell, and an acid feed tank containing hydrochloric acid at sufficient concentration to maintain the anolyte brine at less than about pH 4.0. In operation, the brine tank contains solid sodium chloride, which dissolves in the brine and replenishes the anolyte brine solution as chloride ion is consumed during electrolysis. The acid feed tank is in fluid communication with the brine tank so that the brine is maintained at a constant volume during electrolysis. The above are non-limiting examples of electrolytic chlorine generators, the disclosures of which are incorporated herein by reference.

After intensive research, the inventor has found that the chemical reactions that occur by combining both of the technologies, ozonation and electrolysis, for chlorinating are as follows: Anode reaction in electrolysis cell $$Cl^-+H_2O=HOCl+H+2e^-$$

Chloride+water=hypochlorous acid+hydrogen+electrical energy 2 electrons.

It is hard to explain the results without this $$Cl^-+O_3+H^+=HOCl+O_2$$

Chloride+ozone+hydrogen=hypochlorous acid+oxygen

The following reaction is essential for the disinfectant of the present invention:

$$HOCl+O_3=ClO_2^-+H^++O_2$$

Hypochlorous acid+ozone=chlorite+hydrogen+oxygen $$O_3+2ClO_2^-+2H^+=2ClO_2+O_2+H_2O$$

Ozone+2chlorite+2 hydrogen=2chlorine dioxide+oxygen+water

The aforementioned reaction initiates a chain of reactions leading to the production of at least one of chlorite, chlorine dioxide, and chlorate chlorine dioxide, which is believed to be the central chemical agent of the present invention, which makes it effective for the treatment and disinfections of water and/or wastewater. These further reactions, generally, involve the oxidation of various organic compounds or destruction of pathogens, e.g., bacteria and viruses, by at least one of chlorite, chlorine dioxide, and chlorate and allows a longer ozone residual.

The aqueous solutions containing the chlorine compounds are then injected, mixed with, or contacted with, water and/or wastewater in some type of container, conduit, pipe, chamber, vessel or other enclosed space or cavity so that the chlorine compounds become thoroughly mixed with the water and/or wastewater for sufficient time so that treatment and disinfection of the water and/or wastewater occurs.

Illustrative Embodiment

The invention will now be described using as an example the system shown in the figures, which is designed for treating swimming pool, aquatic mammal tank, hot tub, or fountain water with sizes of 1900 liters on up.

The inventive vortex separator will now be described in greater detail by reference to the illustrative embodiment shown in the figures. This vortex separator is designed for treating, e.g., swimming pool water, hot tub water, aquatic mammal tank water, or fountain water with sizes of 1900 liters (500 gallons) on up.

Figures 3A, 3B, 3C:
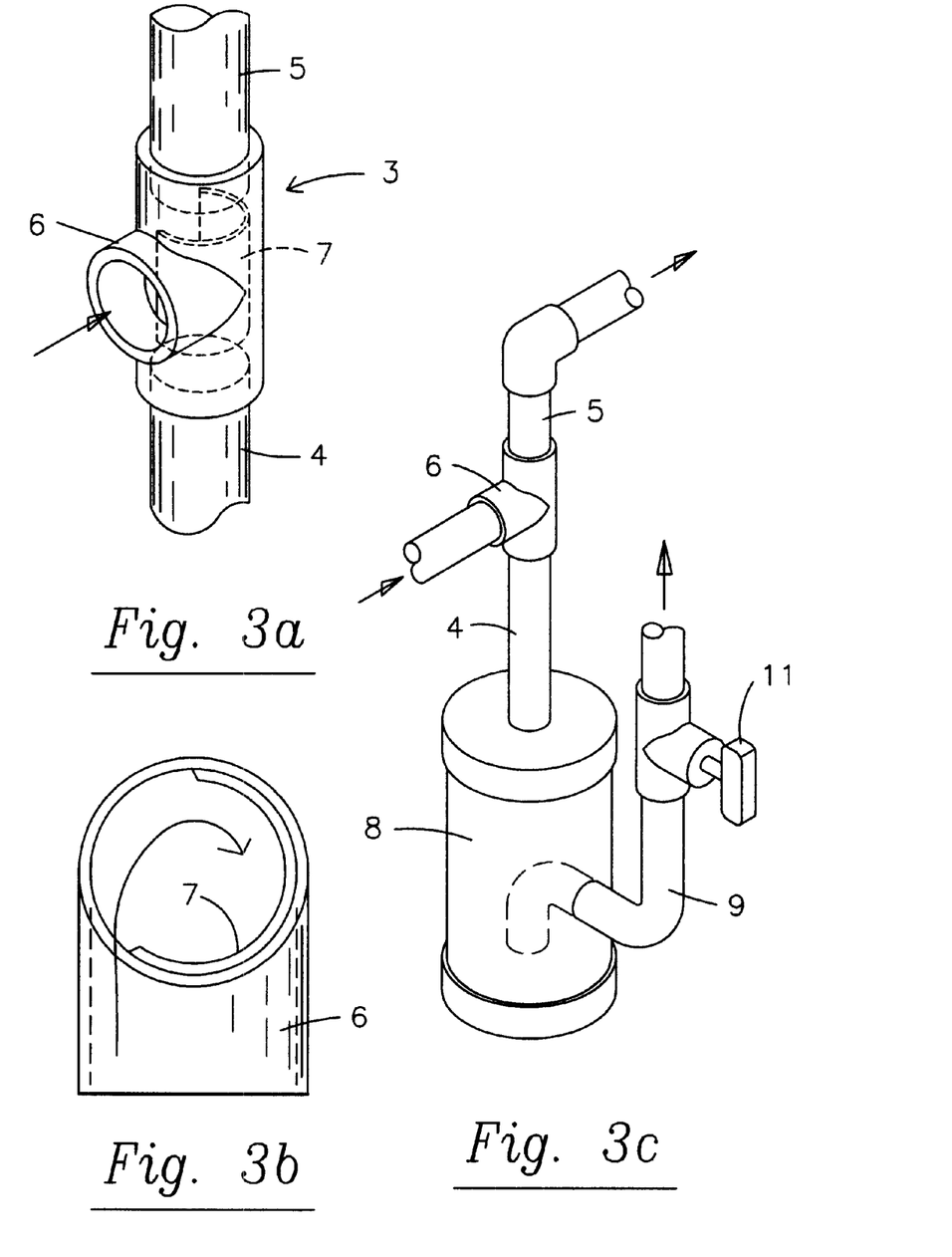

Water is drawn from a source and is pumped optionally horizontally into vortex separator 3. The vortex separator is a generally tubular element comprising an elongated sideways T-junction. The T-junction comprises first 4 and second 5 vertical coaxial longitudinal arms and one horizontal perpendicular feed arm 6. The three arms have approximately the same internal diameter, with the first or lower longitudinal arm, measured from the center of the "T" junction to the end of the arm, having a length of six times its diameter. As the internal diameter is 2 inches, the length of the lower arm is 12 inches. The lower arm terminates in a collection chamber 1, which fills with collected matter and can be easily cleaned by draining through outlet pipe 2, which has an opening just over the floor of the collection chamber 1.

The water with entrained particulate matter travels through the horizontal tangential T-junction arm 6, which opens, into a vertical column. At least one half of the inlet between the horizontal or perpendicular arm and the vertical channel formed by the two longitudinal arms is blocked so as to provide a tangential inlet. That is, water from the feed arm enters the vertical channel along an annular wall, smoothly follows the wall, and is thus immediately brought into a vorticular motion.

This blocking is most easily accomplished by taking a section of pipe having an outer diameter which is the same as, or slightly larger than, the internal diameter of the T-junction, cutting about a three inch long section in the case of a two inch internal diameter T-junction, and cutting this section in half lengthwise so as to make two equal sections, each being arcs describing 180 degrees. One of these sections is then introduced into the longitudinal column of the T-junction and cemented in place in a manner so as to form a gate 7 blocking at least 50%, more preferably about 75%, most preferably about 85–90% of the opening between the perpendicular arm 6 and the longitudinal channel 4, 5 of the T-junction. The abrupt size reduction between the 2 inch diameter of the perpendicular pipe 5 and the inlet adjacent to the gate 7 allows for higher velocity of water, and the contour shape of the longitudinal channel within the T-junction aids in the flow and efficiency of the centrifuge that is produced, thus more particles will be removed by being forced against the annular internal side wall. Particles as small as 20 to 50 microns can be removed through this process.

Preferably, at least the leading longitudinal edge of the gate 7 is beveled or tapered so as to minimize turbulence as the water passes along the inner wall of the T-junction and swirls over the gate 7. Water flowing from the perpendicular arm 6 into the longitudinal channel 4, 5 of the T-junction thus enters tangentially, thereby imparting a swirling vortex flow pattern to the water inside the longitudinal channel of the T-junction.

Since the 2 inch T-junction is designed to receive and join three pipes having internal diameters of 2 inches, it is of necessity larger in inner (and outer) diameter than 2 inches. Since in the preferred embodiment of the invention, the gate 7 is made of the same 2-inch piping used in constructing the vortex separator, insertion of the gate 7 into the T-junction results in an internal dimension, which is similar to the internal diameter of the 2-inch piping.

In the Northern Hemisphere, it is preferred that the vortex generator is so designed that (looking down) the water enters on the left side of the T-junction, thereby giving it a clockwise spin. South of the Equator, it is preferred that the water enters to the right, which will give the vortex a counter-clockwise spin. This results in the vortex being aided by, rather than fighting against, the Coriolis force.

Since the longitudinal channel of the T-junction is oriented vertically, and the vortex swirls about a vertical axis, particulate matter tends to be forced to the outside wall of the vertical longitudinal channel. Particulate matter drops down along the first or lower longitudinal arm 4 of the T-junction, to be collected in a trap or collection chamber 1 connected to the bottom of the lower longitudinal arm, where it is collected and later removed through drain pipe 2. Water, which tends to be free of particulate, after swirling, flows upwards and moves to the next section of the water treatment system.

Collection chamber 1, which serves as the waste collection chamber is no less than 4 inches in diameter, and may be as wide as 8 inches. The minimum height of this waste collection chamber 1 must be no less than 12 inches to avoid the likelihood of particulate mater becoming re-entrained in the water flow and exiting the column of water.

The bottom of the waste collection chamber is connected to a discharge pipe 2 of no less than 1 inch and no greater than 3 inches in diameter, which is selectively opened and closed via a valve. This valve can be opened manually or through a solenoid periodically to flush the debris that is collected in waste collection chamber 1. During operation, there should be no more than about a 3 to 5 lb. pressure drop on the exit side of the waste collection chamber 1 in comparison to the entrance side of the centrifuge, as the difference in pressure aids in the formation of the vortex. If the pressure drop is too great, the longitudinal flow of the water stream will be too great, and if the pressure drop is too small, the vorticular movement of the water will not be sufficient.

In the context of a swimming pool water treatment system, the vortex separator will remove the organic matter and metals that are responsible for clogging the main filter and increasing the chlorine demand, as the biodegradable substances are actually removed from the water column and end up in the collection pot due to their weight and size. This early removal of particulates will also protect the main filter against sharp objects such as gravel and grains of sand, which tend to tear or wear the cloth or laterals on a filter when they are thrust against it by the water flow. The vortex will also remove undissolved calcium in the water that tends to cause a problem with scaling; this again being done through the process of a centrifugation. Any sand present will also be removed and kept out of the system. This represents an improvement over the conventional filter, as sand readily re-enters the pool due to its weight when the regular pool filter is removed for cleaning; the sand grains just fall off as the filter is being lifted out of the filter housing, and the grains of sand just recirculate back into the pool when the pump is reactivated—the process is repeated, and the filter will continually suffer wear and tear due to this.

The centrifuge will eliminate the need to clean the regular pool filter, which now will act as a final water-polishing filter, and in normal use, will need only to be rinsed out once or twice a season. This is attributable to the centrifuge removing all the heavy debris along with the biodegradable substances, thus there will be a negligible pressure drop on the regular pool filter over time, allowing a much longer run time before servicing (cleaning). The centrifuge will also be invaluable in new pool installation where sand and heavy debris—that can destroy filter cartridges—will be completely removed in this process.

Figure 1:
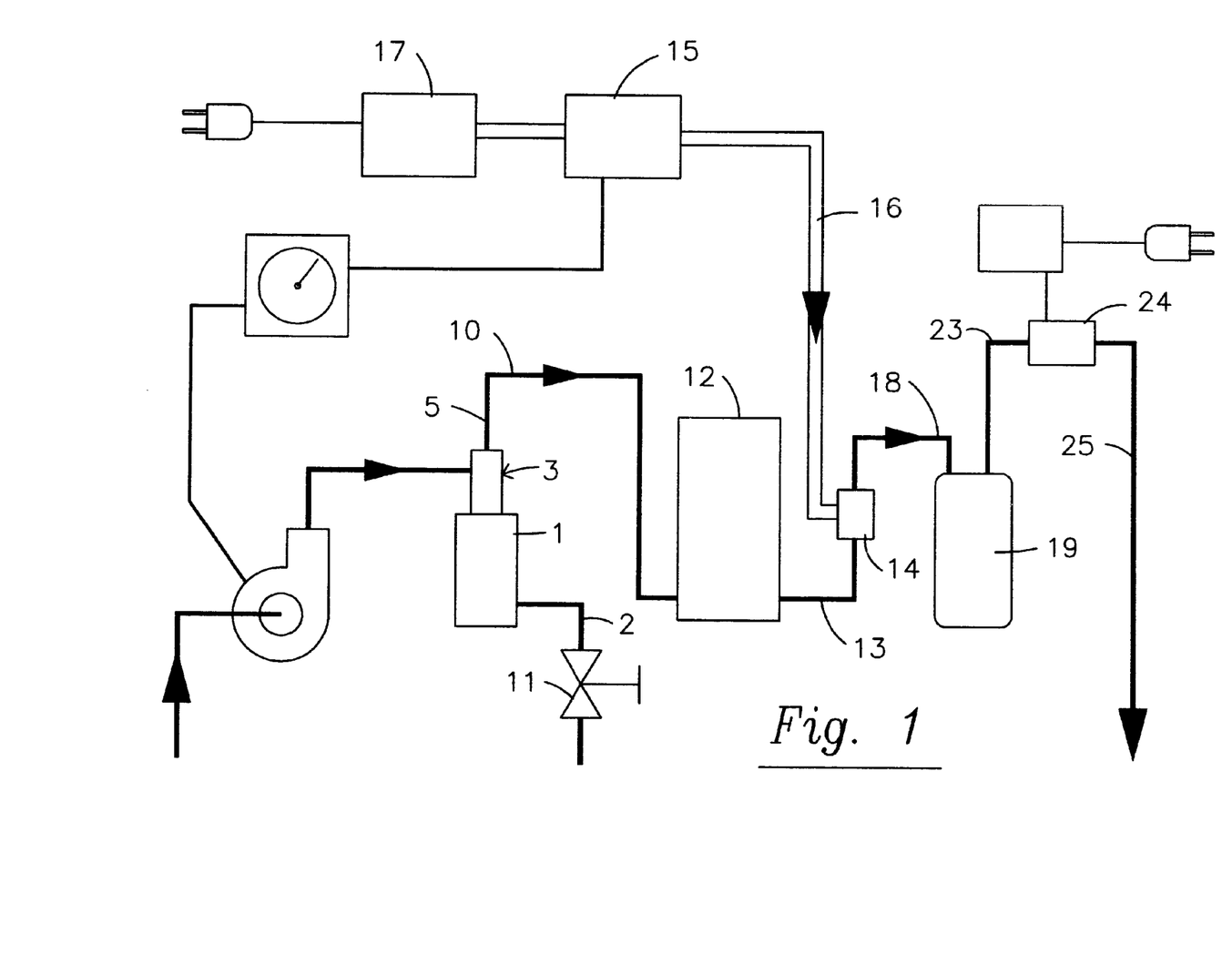
FIG. 1 schematically represents the water purification system of the invention according to the basic embodiment.

Water, which tends to be substantially free of particulate flows upwards along the second longitudinal arm 5 and along conduit 10 to the next section of the water treatment system, which in this case is the conventional pool filter 12. Pool filter 12 can be a cartridge filter, sand filter, or diatomaceous earth filter, and in this example, is a paper cartridge filter. Due to the positioning of this filter in the system after the centrifuge, this filter will require very little maintenance and in some cases may be eliminated altogether.

The water next exits the pool filter 12 via conduit 13 then enters the venturi 14 which draws the ozone in from the ozone generator 15 via hose 16. The ozone generator 15 is connected to a dryer 17 due to the fact that the ozone generator 15 used in this system is of the corona discharge type which needs relatively dry air to produce ozone sufficiently. Corona discharge generators are far more efficient in doing this than the ultraviolet ozone generators due to output failure of the bulbs.

Figure 2:
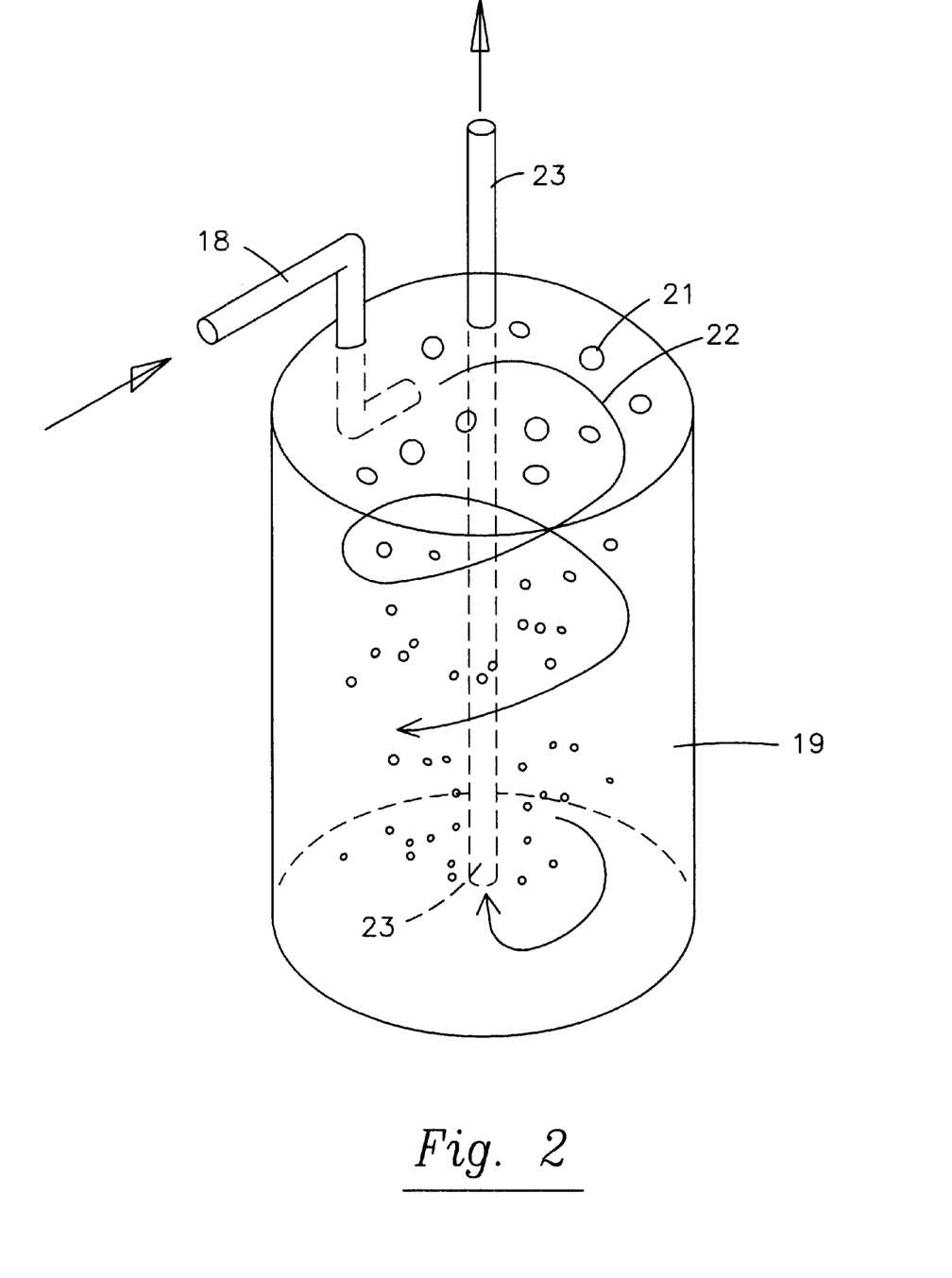
FIG. 2 shows the ozone contact chamber for mixing ozone and water.

The ozone laden water proceeds through a pipe 18 of no less than ½ inch and no greater than 3 inches to enter the contact chamber 19. The contact chamber has a capacity of 1 to 50 gallons. The pipe 18 entering the contact chamber 19 can be elbowed below the top to provide a horizontal and tangential outlet into the contact chamber and thereby aid in imparting a spin of the water and ozone. The ozone introduced upstream through the venturi 14 is entrained by water flow and enters the contact chamber through pipe 18 where ozone gas begins to rise and build up in the upper end of the contact chamber 19, and at the same time, the water begins churning and pushing down on the gas within the chamber resulting on a much smaller bubble size and longer contact time between the ozone and water, thus the gas-water liquid interface is overcome, allowing for maximum dissolution of ozone into the water.

As the water exits out the bottom of pipe 23 within the contact chamber, a redox increase can be seen as much as 850 millivolts with this process. This extensive and unique contacting process has never been applied in process for purifying water for swimming pools, thus ozone has never been able to be dissolved adequately in water. A 3 to 5 lb. pressure drop was achieved for this to work properly in the example. It was found that the contact chamber for ozone must be no less than 20 to 24 inches tall at a water flow of approximately 20–75 gallons per minute with an outer diameter of no less than 8 inches for this flow rate.

An increase of 4–12 inches in height should accompany flow rates of 10 gallons a minute increments above the 50 gallons per minute in order to maintain proper dissolution of ozone in the water and also to obtain and hold a redox potential in excess of 650 millivolts. The exit pipe 23, which extends down through the contact chamber, should be no more than 2" off the bottom of the floor. Ozone treated water leaves the contact chamber 19 and enters the inlet of exit pipe 23, and goes in this pipe up through the middle of the contact chamber 19. The water, which is then saturated with ozone, proceeds to the electrolysis cell 24.

The technology of electrolysis for producing chlorine has been around for quite some time, and was discussed in detail above. In the illustrative example, the unit used was an Autopilot, model Cubby, a titanium base electrode with ruthenium oxide coating, available from WATER Inc. Apollo beach, Fla., under the trademark "CLARIPURE" ™. The chloride level of the swimming pool water is raised by the addition of potassium chloride to reach between 500 mg/l to 2500 mg/l. However, by the marriage of the two sciences of ozonation and electrolyses together, it was surprisingly found that a minimizing of the reductive loading occurs, and higher oxidation states can be achieved. Ozone will reduce the load by oxidizing organics and breaking double bonds thus, no chlorinated organics will be produced. For this to occur, the scfh (standard cubic foot per hour) of ozone intake should be not less than 10 scfh and not more than 60 scfh when the water flow is between 20 and 75 gallons per min, preferably about 25–40 gallons per min. However, the production of oxychlorous species will occur resulting in the production of at least one of $ClO_2^-$(chlorite), $ClO_2$ chlorine dioxide and $ClO_3^-$(chlorate). Chlorite and chlorate are well known to control and eliminate algae and fungus and are also considered strong bacteriastatic agents. Chlorite has been used for marine mammal exhibits such as dolphin or killer whale tanks, as chlorite does not react with ammonia to form irritating amines.

The present invention thus differs from the prior art in taking advantage of synergistic benefits derived from the combination of ozonation and electrolytic chlorination in the same system. Ozone acts not only as an oxidizer of organic matter and metals, it also serves as a microflocculant, and thus, as a clarifier. Electrolytic cells have been used in the past to produce chlorine. In accordance with the present invention, by the provision of ozone upstream of the electrolytic chlorinator, the oxychlorous species, chlorite and chlorate, are produced. Chlorite and chlorate are weaker oxidants than chlorine, but have a longer life and are less susceptible to being destroyed than chlorine, and are effective against algae. Thus, in accordance with the present invention, water is treated by being subjected to ozone, a rapidly reacting oxidant and water clarifier, followed by prolonged exposure to chlorite and chlorate, which are less irritating and more stable than chlorine, and can be tolerated in a swimming pool at much higher levels than chlorine.

The pool water returned to the swimming pool through line 25 did not smell of chlorine, and there were no chloramines that can burn eyes. By maintaining the recommended level of the combination of ozone with the oxychlorine species, a regular shocking of the pool water and the addition of algaecides and chlorine were no longer needed. This also completely eliminated the oily slimy build-up that occurs on the pool walls by biofilm that occurs naturally, especially if heavy bather loads are encountered. The result was a pool free of maintenance and chemical hassle.

The electrolytic cell should not have more than 40 gallons a minute proceeding through it, otherwise, any disinfectant will be produced. When pools have water features such as waterfalls and fountains that require more water, a by pass line and valve must be installed. This will divert the flow away from the electrolytic cell, allowing the production of the disinfectant to be made, and at the same time, allow enough water for the water features.

When the pool is in excess of 25,000 gallons, a second Electrolysis generator and control box are installed in series.

Although this invention has been described in its preferred form with a certain degree of particularity with respect to a swimming pool water purification system, it is understood that the present disclosure of the preferred form has been made only by way of example, and that numerous changes in the details of structures and composition of the product may be resorted to without departing from the spirit and scope of the invention.

What is claimed is:

1. A method of treating a water reservoir by using at least one of chlorite, chlorine dioxide, and chlorate, the method comprising the steps of:
   (a) producing at least one of chlorite, chlorine dioxide, and chlorate by:
       feeding ozone into a water stream containing chloride to produce ozonated-chloride water wherein said ozone and water are mixed in an ozone contact chamber having a central vertical axis and defining an enclosed space and having an inlet, an outlet, a top and bottom, wherein said stream of water is injected with ozone and enters within the top quarter of said enclosed space and is withdrawn within 2 inches of said bottom to produce ozonated water, wherein the ozone and stream of water are injected into said enclosed space through said inlet and tangential to said central axis to impart turbulence and a swirling motion to ozone and stream of water contained within said enclosed space, wherein said ozone generally forms a laminar stratification within said enclosed space, wherein said ozone generally forms a laminar stratification within said enclosed space, with larger bubbles forming upper strata and progressively finer bubbles forming progressively lower layers, and wherein water with dissolved ozone is withdrawn via said outlet; and
       electrolyzing said ozonated-chloride water inside an electrolytic cell to produce at least one of chlorite, chlorine dioxide and chlorate;
   (b) introducing at least one of chlorite, chlorine dioxide and chlorate into a water reservoir.

2. A method for treating a swimming pool or spa, comprising:
   (a) generating a flow of water in a water reservoir system; and
   (b) introducing a bacteristatic effective amount of at least one of chlorite, chlorine dioxide and chlorate into said flow of water;
       wherein said at least one chlorite, chlorine dioxide and chlorate is produced by subjecting said flow of water containing chloride ion to ozonation to produce ozonated-chloride water followed by subjecting said ozonated water to electrolytic chlorination wherein said ozonation includes mixing ozone and water in an ozone contact chamber having a central vertical axis and defining an enclosed space and having an inlet, an outlet, a top and bottom, wherein said stream of water is injected with ozone and enters within the top quarter of said enclosed space and is withdrawn within 2 inches of said bottom to produce ozonated water, wherein the ozone and stream of water are injected into said enclosed space through said inlet and tangential to said central axis to impart turbulence and a swirling motion to ozone and stream of water contained within said enclosed space, wherein said ozone generally forms a laminar stratification within said enclosed space, with larger bubbles forming upper strata and progressively finer bubbles forming progressively lower layers, and wherein water with dissolved ozone is withdrawn via said outlet.

3. A method for treating a swimming pool or spa, comprising:
   (a) generating a flow of water in a water reservoir system; and
   (b) introducing a bacteristatic effective amount of at least one of chlorite, chlorine dioxide and chlorate into said flow of water;
       wherein said at least one of chlorite, chloride dioxide and chlorate is produced by subjecting said flow of water to electrolytic chlorination to produce chlorinated water followed by subjecting said chlorinated water to ozonation, wherein said ozonation includes mixing ozone and water in an ozone contact chamber having a central vertical axis and defining an enclosed space and having an inlet, an outlet, a top and bottom, wherein said stream of water is injected with ozone and enters within the top quarter of said enclosed space and is withdrawn within 2 inches of said bottom to produce ozonated water, wherein the ozone and stream of water are injected into said enclosed space through said inlet and tangential to said central axis to impart turbulence and a swirling motion to ozone and stream of water contained within said enclosed space, wherein said ozone generally forms a laminar stratification within said enclosed space, with larger bubbles forming upper strata and progressively finer bubbles forming progressively lower layers, and wherein water with dissolved ozone is withdrawn via said outlet.

4. A method as in claim 3, wherein said enclosed space has a capacity of from 1 to 50 gallons.

5. A method for purifying water, said method comprising, in sequence:
   (a) providing a stream of water and optionally subjecting the stream of water to a vortex separator to separate particulate matter from said stream of water;
   (b) optionally subjecting said stream of water from step (a) to a mechanical filter;
   (c) injecting ozone into said stream of water to produce ozonated water;
   (d) mixing said ozonated water in an ozone contact chamber having a central vertical axis and defining an enclosed space and having an inlet, an outlet, a top and bottom, wherein said stream of water is injected with ozone and enters within the top quarter of said enclosed space and is withdrawn within 2 inches of said bottom to produce ozonated water, wherein the ozone and stream of water are injected into said enclosed space through said inlet and tangential to said central axis to impart turbulence and a swirling motion to ozone and stream of water contained within said enclosed space, wherein said ozone generally forms a laminar stratification within said enclosed space, with larger bubbles forming upper strata and progressively finer bubbles forming progressively lower layers, and wherein water with dissolved ozone is withdrawn via said outlet;
   (e) introducing said ozonated water from step (d) into an electrolytic chlorinator to produce at least one of chlorite, chlorine dioxide and chlorate; and
   (f) introducing the product of step (e) into a water reservoir.

* * * * *